United States Patent [19]
Palmer, Jr.

[11] 3,912,764
[45] Oct. 14, 1975

[54] PREPARATION OF ALKENYL SUCCINIC ANHYDRIDES
[75] Inventor: John F. Palmer, Jr., Ladue, Mo.
[73] Assignee: Edwin Cooper, Inc., St. Louis, Mo.
[22] Filed: Sept. 29, 1972
[21] Appl. No.: 293,577

[52] U.S. Cl. .............................................. 260/346.8
[51] Int. Cl.² ........................................ C07D 307/60
[58] Field of Search ............................ 260/346.8 R

[56] References Cited
UNITED STATES PATENTS
3,231,587 1/1966 Rense .............................. 260/346.8
3,445,386 5/1969 Otto et al ............................ 260/309

Primary Examiner—Henry R. Jiles
Assistant Examiner—Bernard I. Dentz
Attorney, Agent, or Firm—Bacon & Thomas

[57] ABSTRACT

Alkenyl succinic anhydrides are prepared by first thermally reacting olefinic polymers with maleic anhydride to a point short of complete reaction of all of the maleic anhydride and then continuing the reaction in the presence of a small amount of chlorine.

8 Claims, No Drawings

PREPARATION OF ALKENYL SUCCINIC ANHYDRIDES

This invention relates to a process for producing alkenyl succinic anhydrides.

High molecular weight hydrocarbon substituted succinic anhydrides are well known in the art and have many important industrial uses. They can be prepared by thermally reacting polyolefins of average molecular weight above about 200 with maleic anhydride at temperatures in excess of about 200°C. However, this reaction suffers from a relatively low degree of conversion and if an attempt is made to improve the degree of conversion by increasing the temperature or pressure, an undesirable degradation of maleic anhydride occurs with resulting formation of carbon dioxide, water and tarry solids. For this reason, resort has been made to initial preparation of a halogenated hydrocarbon reactant followed by reaction of the halogenated hydrocarbon with maleic anhydride. An alternative to this process, as disclosed in U.S. Pat. No. 3,231,587, comprises the preparation of a mixture of the olefin polymer with maleic anhydride followed by contacting this mixture at a temperature of about 160°C to about 250°C with about 1 mole of chlorine for each mole of maleic anhydride over a period of 5 hours or more. In these chlorination processes a relatively high concentration of chlorine is in contact with the reaction vessel for substantial lengths of time necessitating the use of special equipment for the entire reaction and the final product contains at least 0.4% of residual chlorine.

It has now been discovered that the disadvantages of the thermal reaction process can be avoided and that a product having low residual chlorine content can be produced by a two-stage process in which in a first stage a thermal reaction between the olefin polymer and maleic anhydride is carried out to a point short of complete reaction of all of the maleic anhydride and the reaction is then continued in a second stage in the presence of a small amount of chlorine, less than 1 mole of chlorine for each mole of maleic anhydride then present in the reaction mass, until the remaining maleic anhydride is substantially used up. By this process relatively low reaction temperatures can be used in the thermal stage of the reaction thereby reducing the formation of tars and waste products usually associated with this reaction and a final product can be produced which has less than 0.15% residual chlorine. Conventional equipment can be used in the first reaction stage, which is the most time consuming, without encountering corrosion problems due to presence of chlorine.

The process of the invention can be carried out with olefinic polymers of 200 to 50,000 molecular weight or higher. Polymers of intermediate molecular weights of 500 to 2500 are especially useful. Polymers contemplated for use in this process include homopolymers of lower mono-olefins, i.e., ethylene, propylene, n-butylene, isobutylene; copolymers and terpolymers of the lower mono-olefins and higher mono-olefins and diolefins. Preferred polymers are those of isobutylene due to availability and usefulness of end products.

As known in the art, the proportions of olefin polymer and maleic anhydride may vary according to the proportion of succinic anhydride radicals desired in the product. In general, from 0.3 to 2 or more moles of maleic anhydride are used for each mole of polymer. Any unreacted polymer will remain in the product as a diluent without adverse effect.

The olefin polymer and maleic anhydride are thoroughly mixed and the mixture is then raised to reaction temperature and allowed to stand at this temperature until at least about half of the maleic anhydride has been used up but short of complete reaction of all of the maleic anhydride. The temperature employed may be in the range of 180°C to 250°C but it is preferred to use the lowest practical reaction temperature at this stage at which reaction of at least about one-half of the maleic anhydride can be accomplished. Temperatures in the range of 200°–230°C are particularly satisfactory for the reaction of polyisobutylene with maleic anhydride in this stage.

After the initial thermal reaction stage, chlorine is introduced into the reaction mass and the reaction is continued. The temperature during the chlorination stage may be the same or lower than that of the thermal cooking stage. In general, the temperature during this stage may be from 160°C to 225°C, preferably about 165°C to 200°C. Less than 1 mole of chlorine per mole of maleic anhydride present in the partially reacted mass from the first stage need be used. Satisfactory results are obtained when less than 0.7 moles of chlorine per mole of unreacted maleic anhydride are used. On an overall basis the process can be operated with as low as 0.01 moles of chlorine per mole of maleic anhydride, based on the maleic anhydride of the initial reaction mixture, and a product having less than 0.1% residual chlorine content can be obtained.

The first stage thermal reaction can be carried out in a conventional polymer cooking vessel and the partially reacted mass transferred to a corrosion resistant vessel for the final reaction in the second stage of the entire reaction can be carried out in a corrosion resistant vessel.

The process will be further illustrated by the following representative examples:

EXAMPLE 1

1200 Grams of polyisobutene of average molecular weight of 895 and 144 grams of maleic anhydride were placed in an autoclave. The charged autoclave was evacuated to −27 in. Hg. and sealed off. The reactant mass was then heated to 221°C under agitation in 88 minutes and was held in the temperature range of 220°C to 225°C for 5 hours. At the end of the cook period the reaction mass was cooled while under agitation and was determined to contain 4.73% of unreacted maleic anhydride. 358 Grams of the partially reacted mass, containing 16.9 grams of maleic anhydride were placed in a glass reactor and brought to a temperature of 190°C. 6.8 grams of chlorine gas (0.55 moles/mole of unreacted maleic anhydride) was sparged into the mixture through a sintered glass tube over a period of 88 minutes. At the end of the chlorine addition the batch was held for an additional 60 minutes at reaction temperature. At the end of this period it was vacuum topped to 50 mm. Hg. absolute at 200°C and then filtered through filter-aid pre-coated glass fiber paper. The finished product had an acid number of 0.88 and contained only 0.065% chlorine. It contained 31.1% of unreacted polyisobutene.

EXAMPLE II

1200 Grams of polyisobutene of av. m.w. 882 and 130.7 grams of maleic anhydride were placed in an autoclave as in Example I and reactants were brought to 220°C in 110 minutes. The mass was cooked at 220–227°C for 5 hours. The partially reacted mass contained 3.99% unreacted maleic anhydride. 1257 Grams of the reaction mass, containing 50 grams of unreacted maleic anhydride, were transferred to the glass reactor and brought to a temperature of 190°C. 24.3 grams of chlorine (0.67 moles/mole of unreacted maleic anhydride) were added over a period of 100 minutes and the mass was held at reaction temperature for 60 minutes. After vacuum treatment and filtration as in Example 1, the product had an acid number of 0.91 and less than 0.1% chlorine. It contained 27.8% of unreacted polyisobutene.

By comparison, the same materials (without $Cl_2$) in the same proportions, when thermally reacted at higher temperature (245–250°C for 5 hours) gave a reaction mass containing a greater amount of unreacted materials as well as tarry solids. When this reaction mass was vacuum distilled to remove unreacted maleic anhydride and filtered to remove tars it gave a product having an Acid No. of 0.78 containing 37.9% unreacted polyisobutene.

The advantages of the process of the invention over the thermal process alone are higher degree of conversion, reduced guantity of waste products, more efficient use of the reactants, easier control of end product properties and lower reaction temperatures. Advantages over the complete chlorination process of the prior art include reduced chlorine usage, reduced chlorine content in end product, possibility of using more conventional equipment for major portion of the reaction.

The hydrocarbon substituted succinic end products of this invention are useful as rust inhibiting additives in gasolines, fuel oils, automotive engine lubricants, etc. As amide or imide salts they are useful as ashless detergent-dispersants in automotive engine lubricants.

It will be understood that various modifications of the invention can be practiced by those skilled in the art. without departing from the scope and spirit of the invention.

I claim:

1. A process for the production of alkenyl succinic anhydrides, comprising: thermally reacting an olefin polymer having an average molecular weight in the range of 200 to 50,000 with maleic anhydride until at least one-half but not all of the maleic anhydride has reacted and then continuing the reaction in the presence of an amount of chlorine less than one mole per mole of maleic anhydride present at the end of the thermal reaction.

2. The process of claim 1 wherein the thermal reaction is conducted at a temperature in the range of about 200°–230°C and the chlorination reaction is conducted at a temperature lower than that of the thermal reaction.

3. The process of claim 1 wherein the amount of chlorine is less than 0.7 moles per mole of unreacted maleic anhydride present at the end of the thermal reaction stage.

4. The process of claim 1 wherein the olefin polymer has an average molecular weight in the range of about 500 to 2500.

5. The process of claim 4 wherein the olefin polymer is polyisobutene.

6. The process of claim 1 wherein the thermal reaction and chlorination reaction are conducted in separate reaction vessels.

7. A process for the production of alkenyl substituted succinic anhydrides, comprising: thermally reacting an olefin polymer having an average molecular weight in the range of about 500 to 2500 with maleic anhydride at a temperature in the range of about 200°–230°C until at least one-half but not all of the maleic anhydride has reacted, then continuing the reaction at a temperature in the range of about 160°–200°C while introducing chlorine into the reaction mass in an amount of less than 1 mole per mole of unreacted maleic anhydride present at the end of the thermal reaction.

8. The process of claim 7 wherein the olefin polymer is polyisobutene.

* * * * *